Oct. 20, 1964 E. C. HERBKERSMAN 3,153,276
MULTI-STATION MACHINE INCLUDING WORK-HOLDING
AND POSITIONING APPARATUS
Filed Aug. 24, 1961 13 Sheets-Sheet 1

INVENTOR.
EARLE C. HERBKERSMAN
BY
his ATTORNEY.

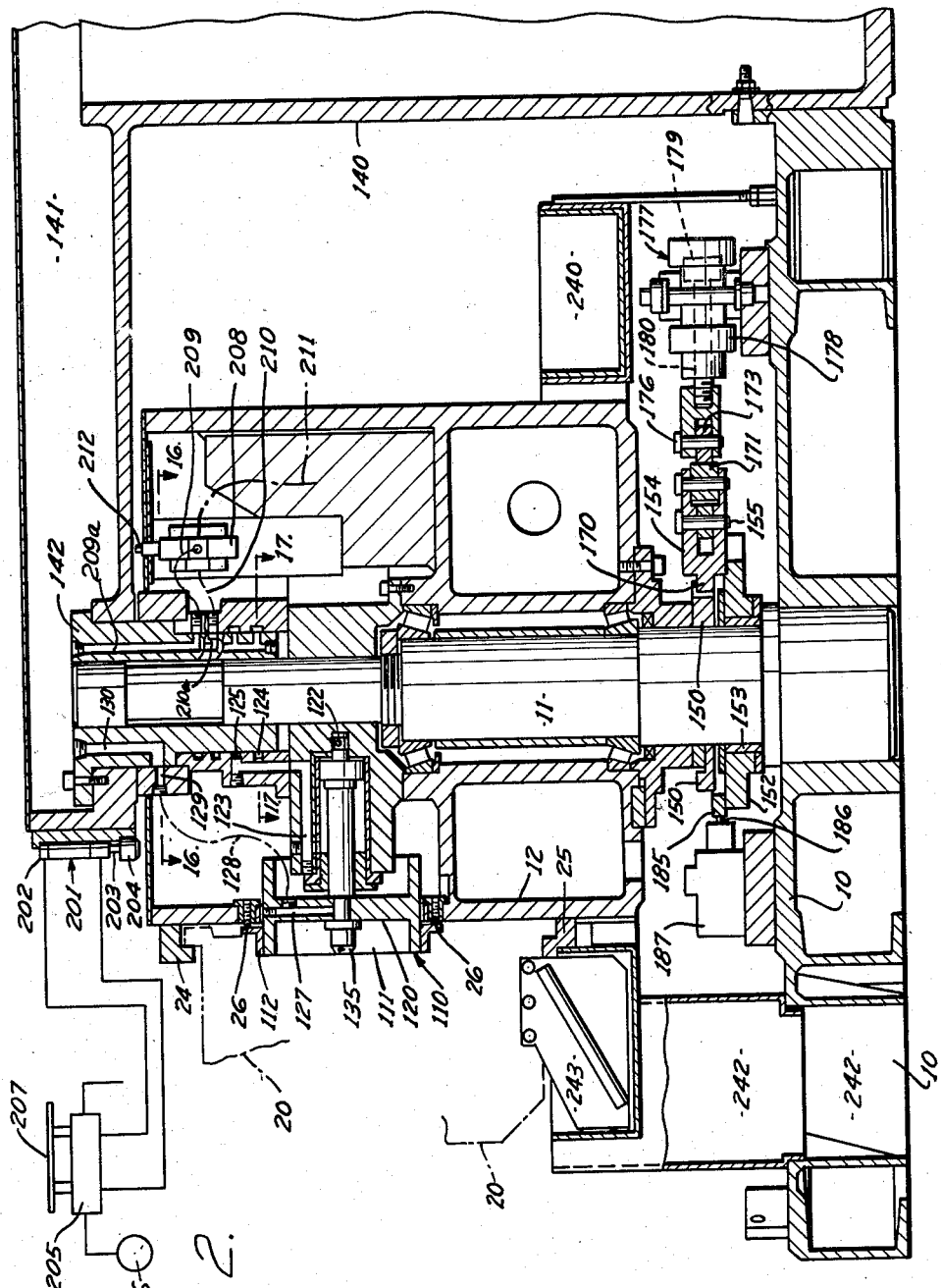

Oct. 20, 1964  E. C. HERBKERSMAN  3,153,276
MULTI-STATION MACHINE INCLUDING WORK-HOLDING
AND POSITIONING APPARATUS
Filed Aug. 24, 1961  13 Sheets-Sheet 3
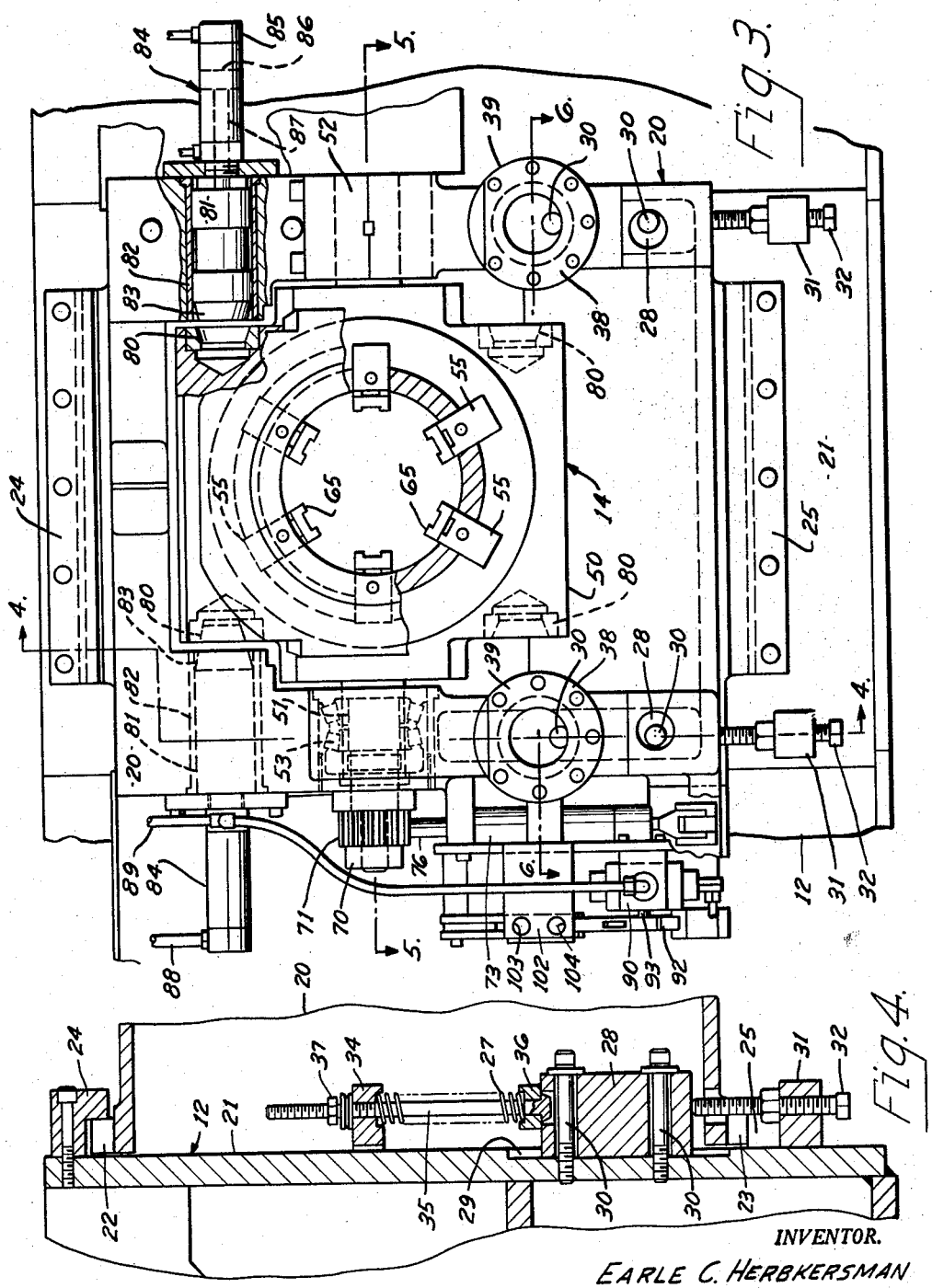
INVENTOR.
EARLE C. HERBKERSMAN
BY
ATTORNEY.

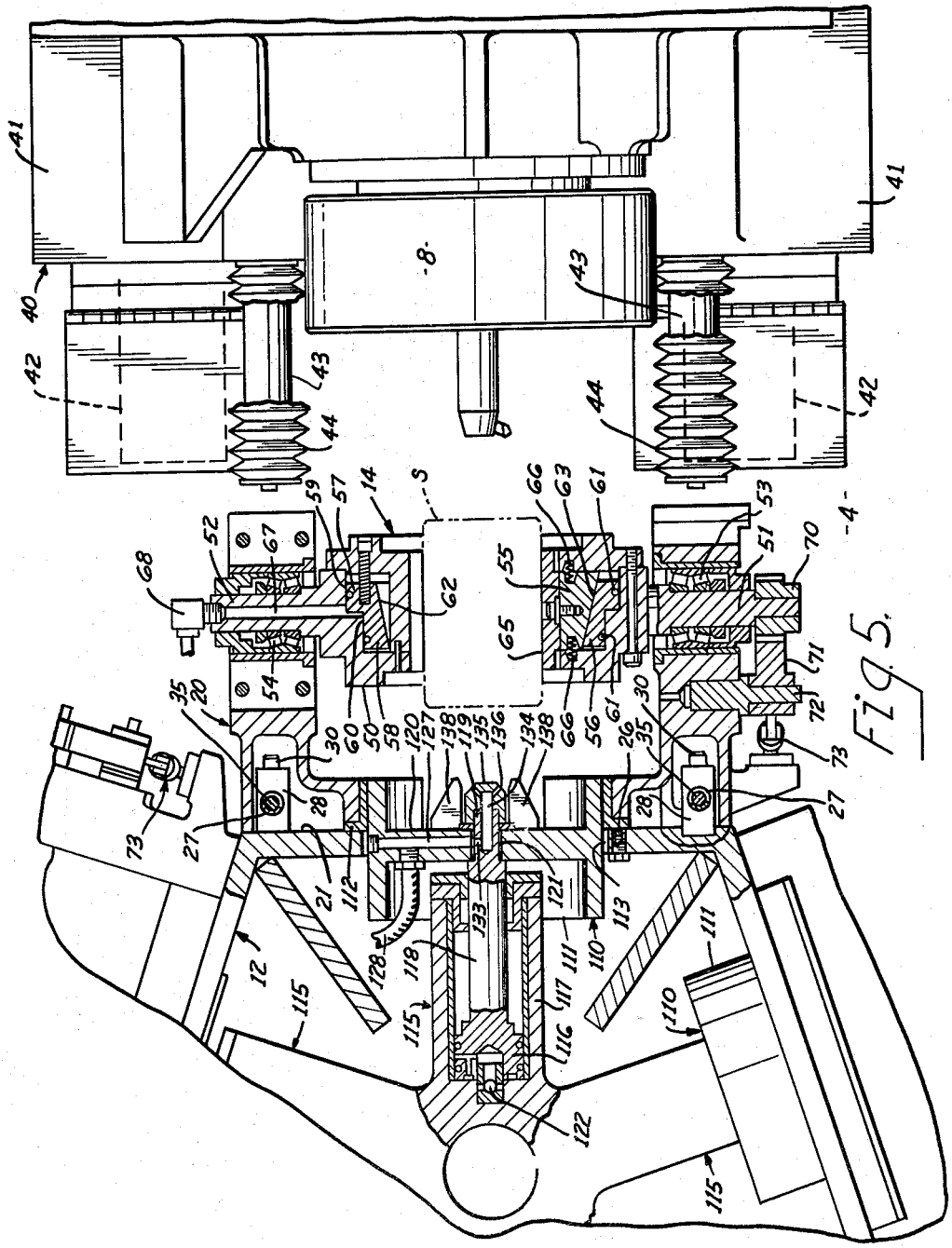

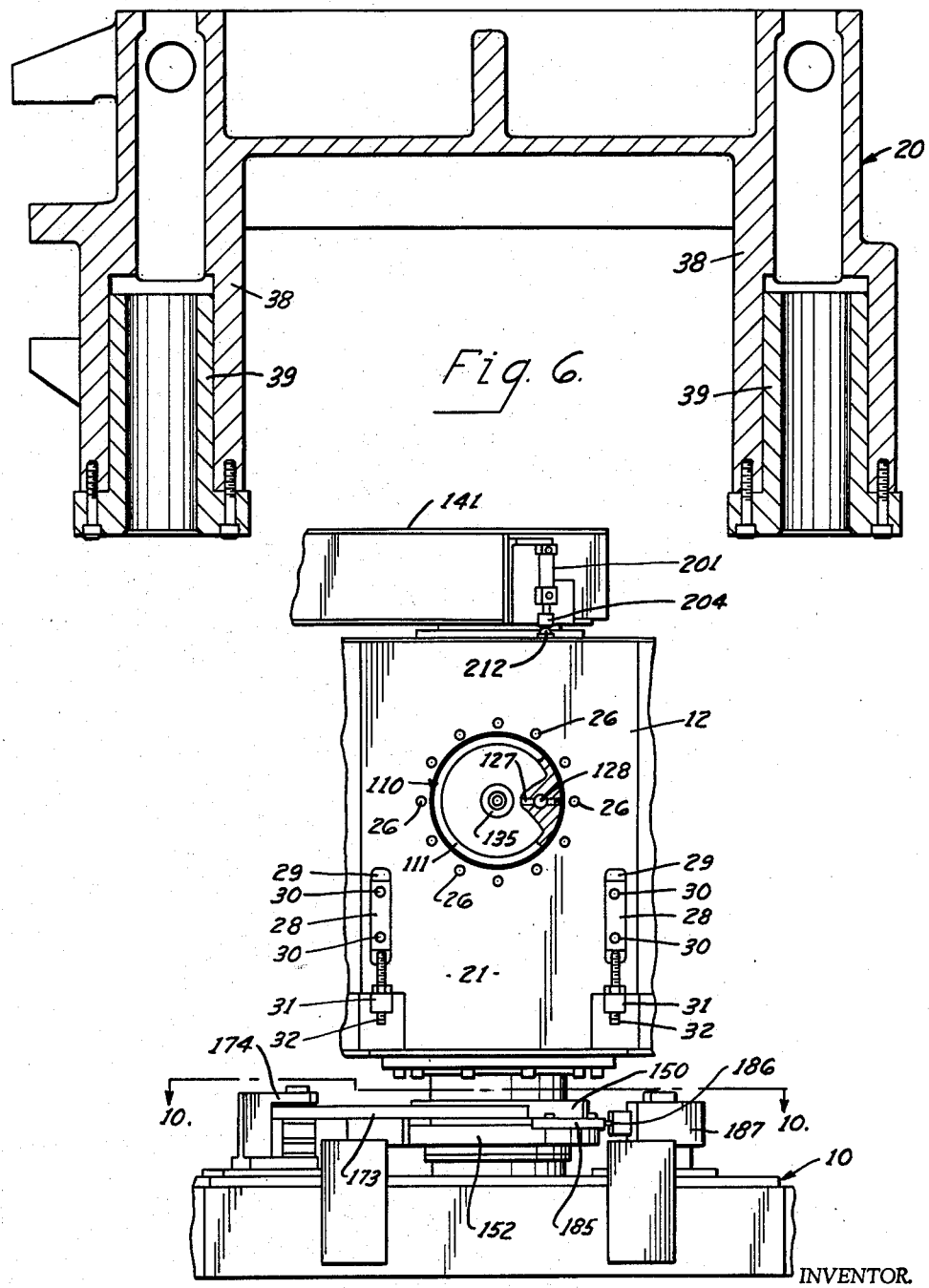

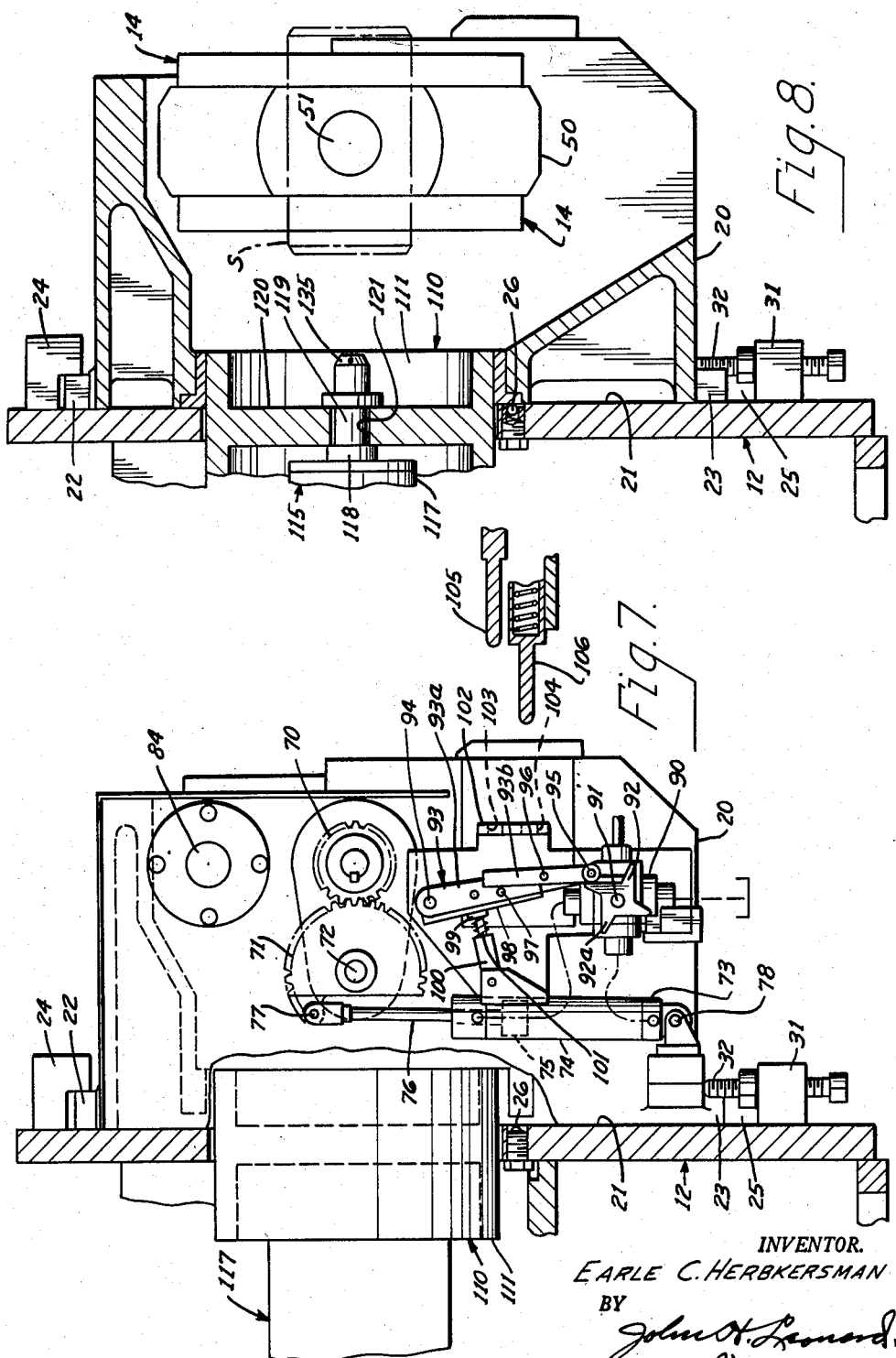

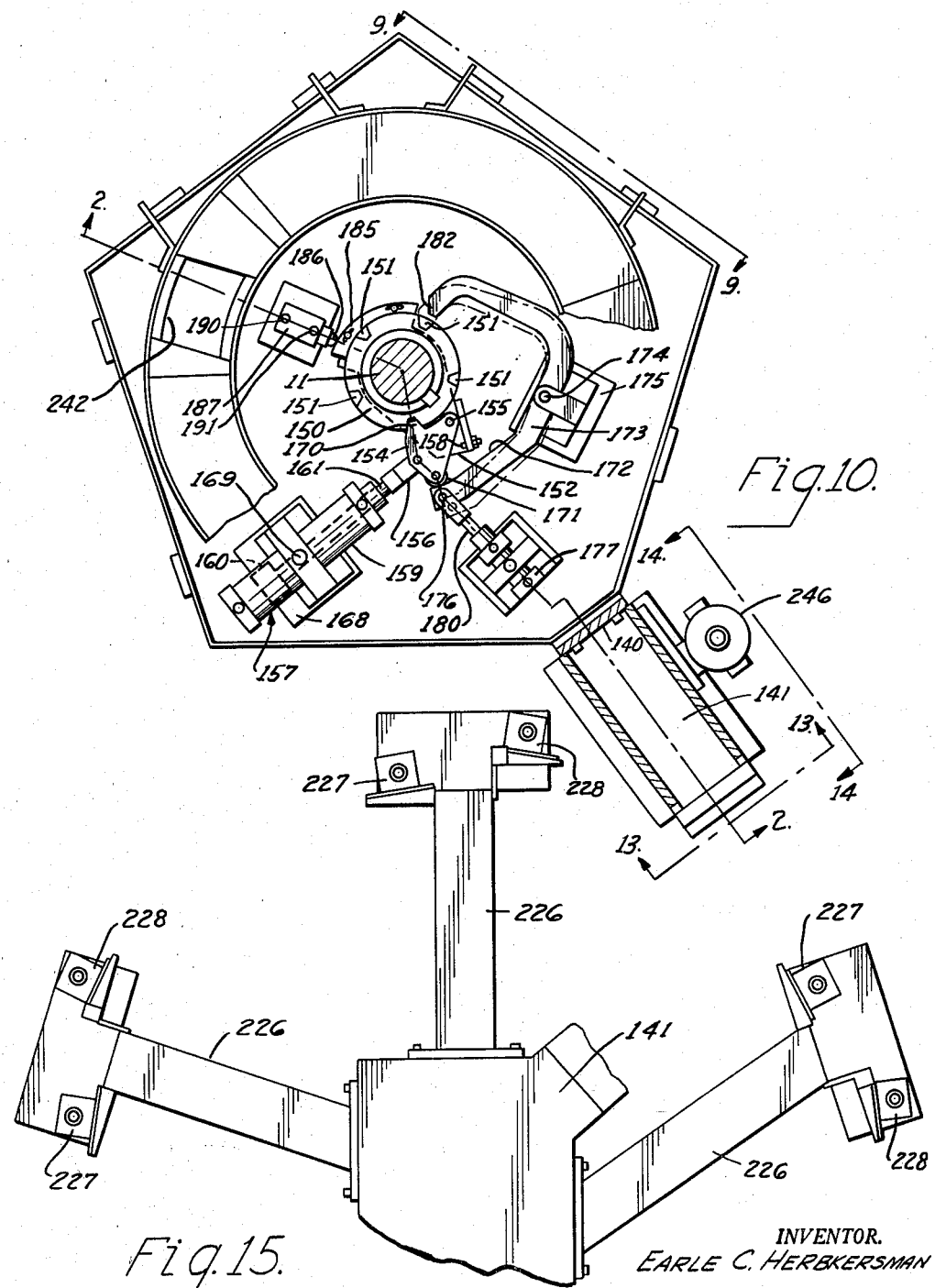

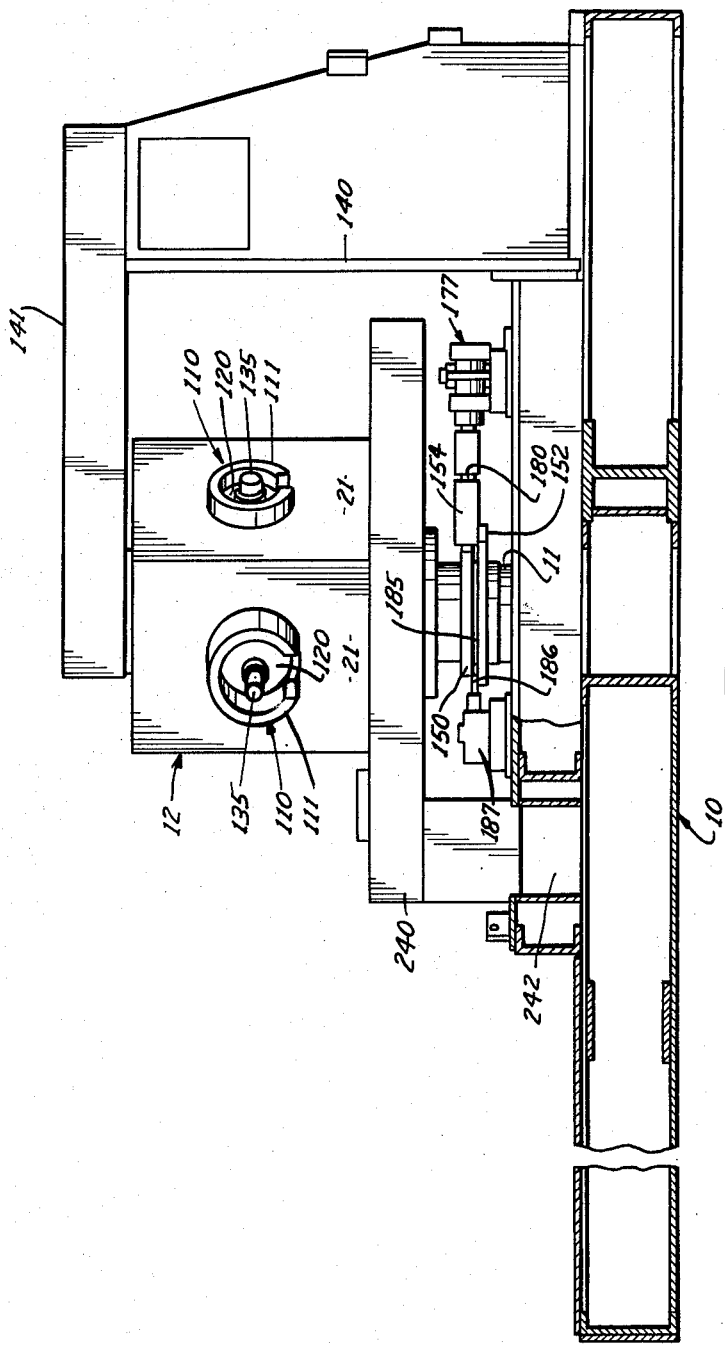

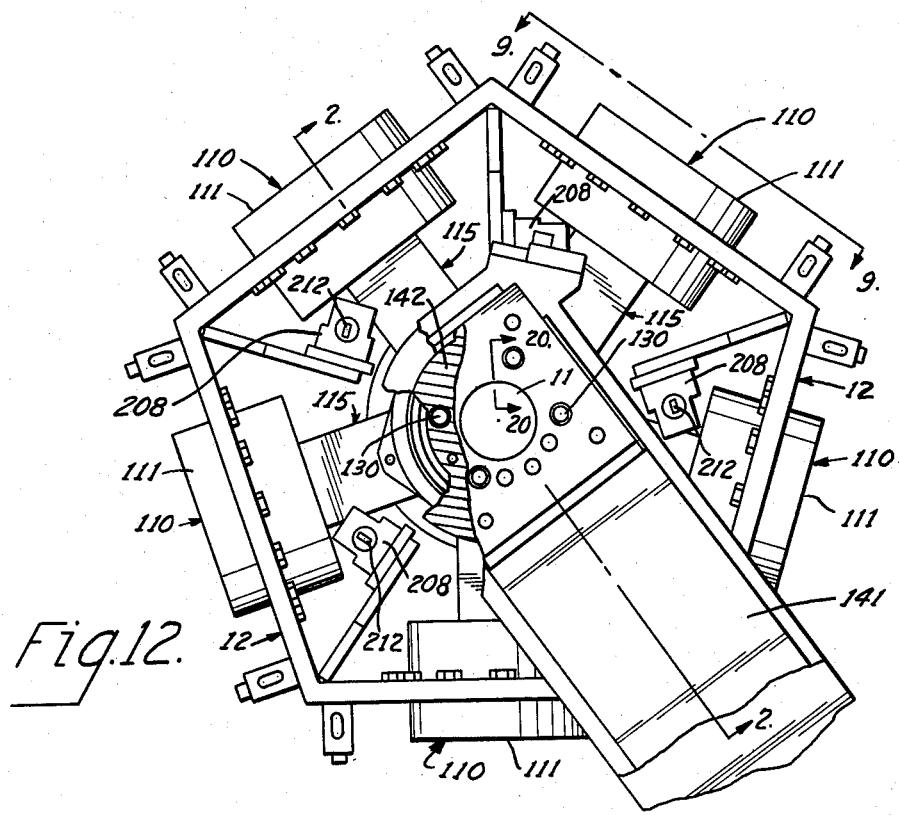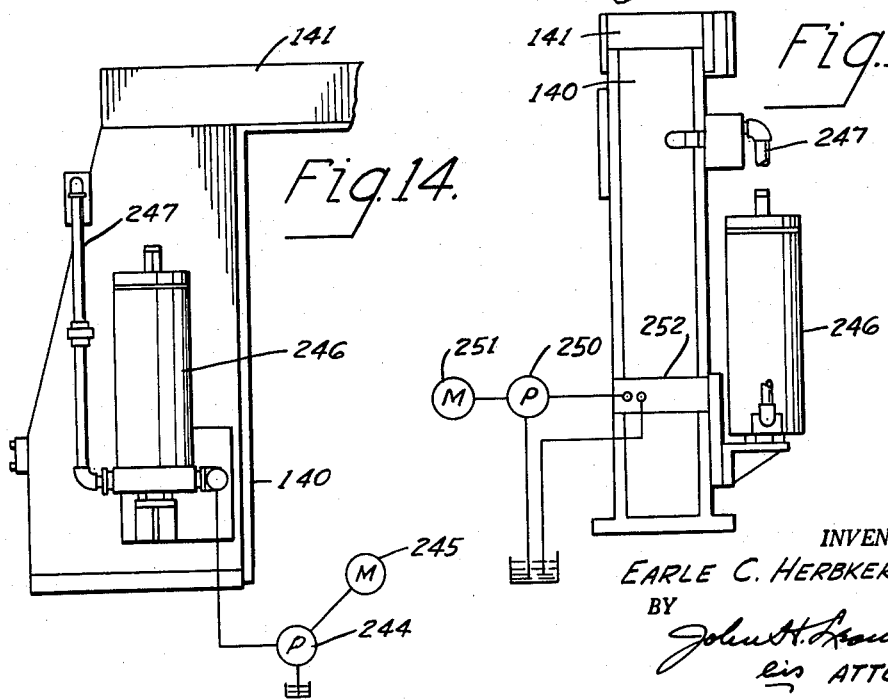

INVENTOR.
EARLE C. HERBKERSMAN
BY
his ATTORNEY.

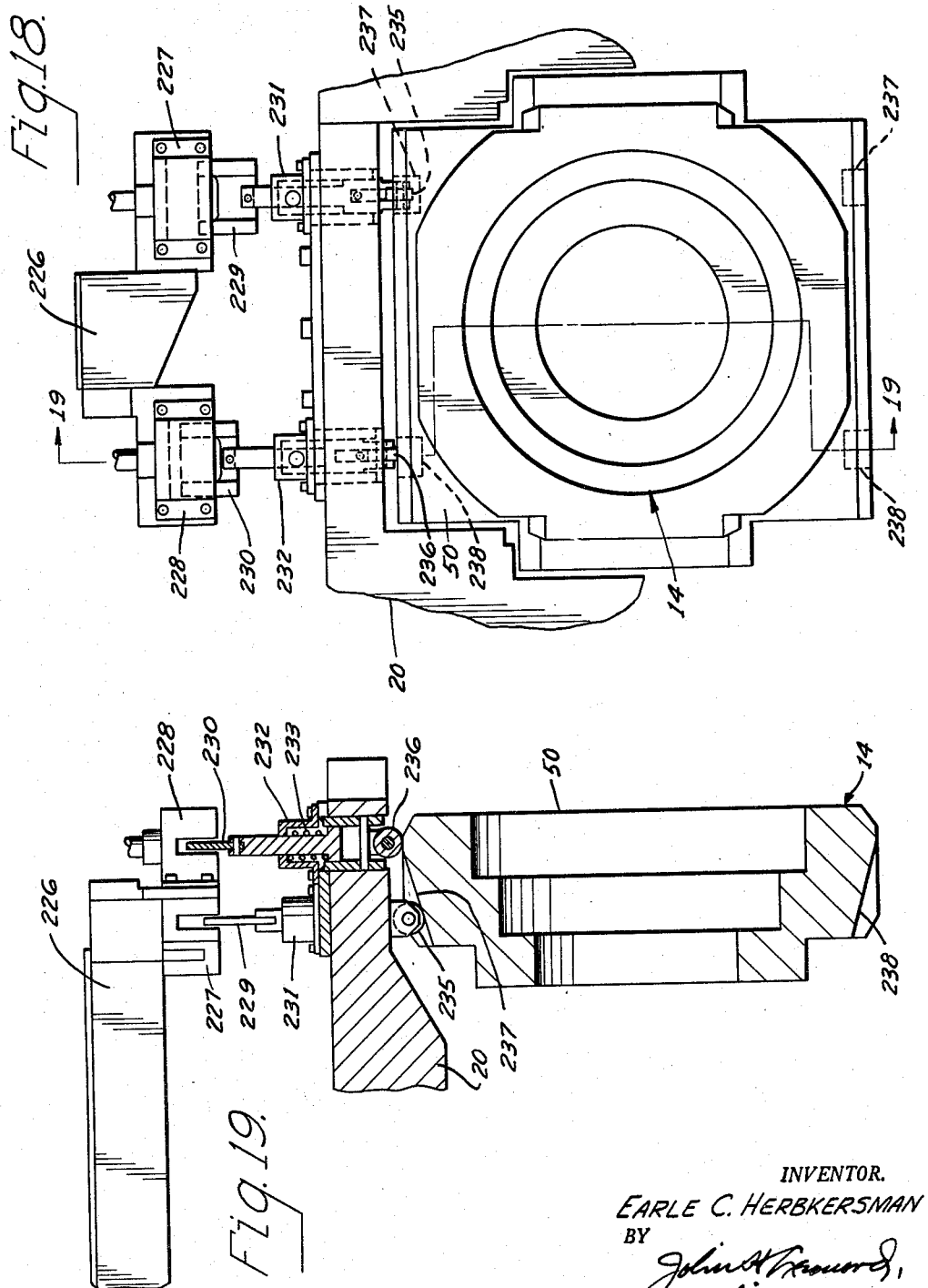

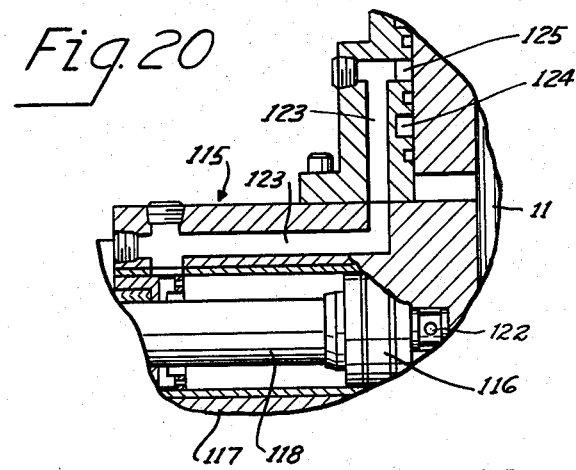
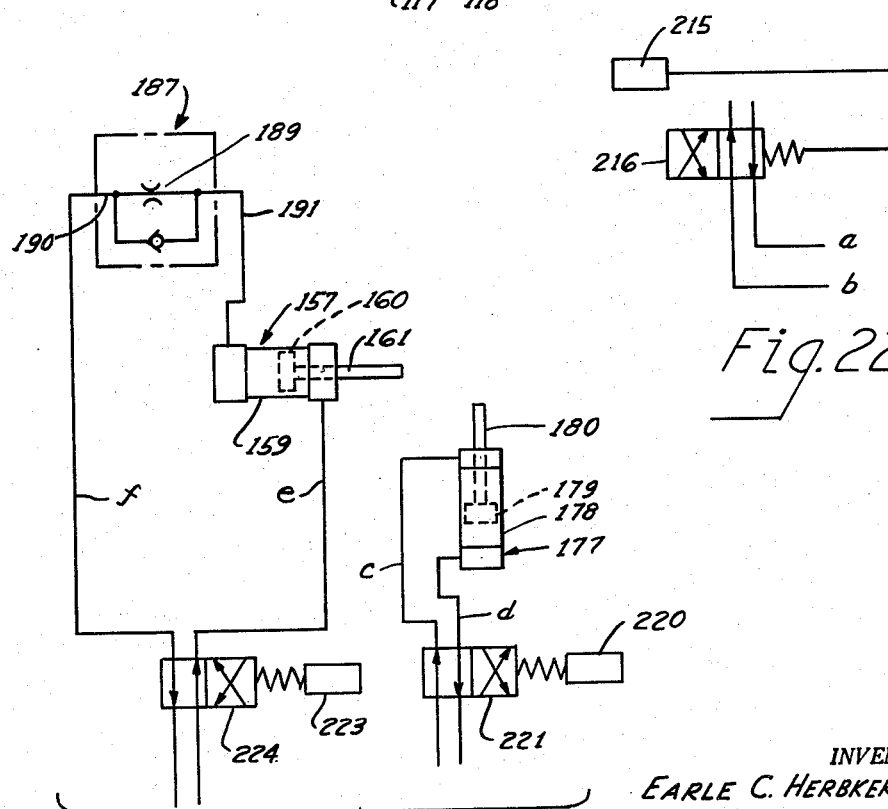

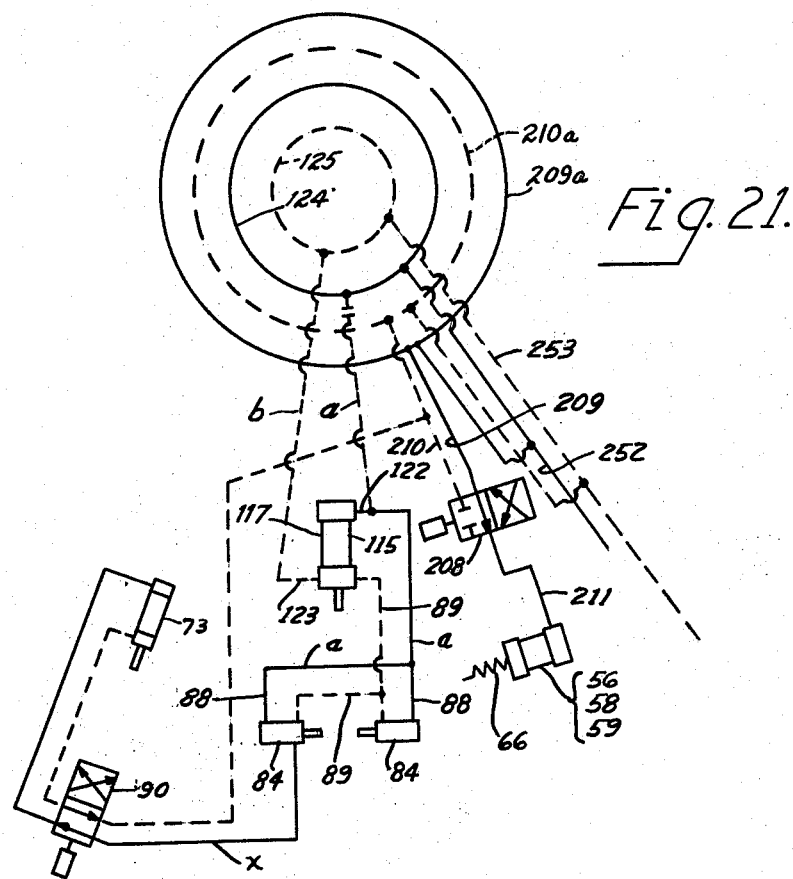

United States Patent Office 3,153,276
Patented Oct. 20, 1964

3,153,276
MULTI-STATION MACHINE INCLUDING WORK-HOLDING AND POSITIONING APPARATUS
Earle C. Herbkersman, Parma, Ohio, assignor to The Pipe Machinery Company, Wickliffe, Ohio, a corporation of Ohio
Filed Aug. 24, 1961, Ser. No. 133,718
5 Claims. (Cl. 29—38)

This invention relates to a multi-station machine for performing successive operations on a workpiece, and particularly to a multi-station machine in which successive operations are performed on opposite ends of an elongated tubular member at the stations, respectively.

The invention also relates to the work-holding and positioning apparatus forming part of the machine.

For the purposes of illustration, the invention is described as applied to the machining of tubular forged cylindrical sleeves to form pipe couplings, wherein each sleeve is machined from each end at each of a number of successive work stations. The use of the invention in connection with machining other types of articles will be apparent from the illustrative example.

Generally, in the machining of a forged metal sleeve to form pipe couplings, the procedure is first to face the sleeve at each end; second, to bore the sleeve from each end; third, to tap it from each end; and finally, optionally, to debur it at each end. Heretofore, this procedure has been accomplished by a number of independent operations wherein the workpiece is machined at one station and then unloaded from its chuck, transported to a succeeding station, and then reloaded into a chuck, and additionlaly machined, and so on until the coupling is completed.

According to the present invention, the sleeve is chucked only once and remains in its chuck while carried by a revolvable turret successively to the different stations, depending upon the particular machining operations to be performed. At each station, it is machined first from one end and then reversed and machined from the other end. This sequence continues until all of the machining operations to be performed have been completed.

Broadly, therefore, the machine comprises a turret which is revolvable about an upright axis. A plurality of work stations are arranged about the turret and at each station is a rotary spindle machine. The turret carries a plurality of chucks and is intermittently driven and indexed so as to bring each chuck successively in alignment with the work stations. Each spindle machine moves toward and away from the chuck, axially of the chuck throat or sleeve held in the chuck. Each chuck is mounted on a carriage which, in turn, is mounted on the turret for limited universal floating movement relative thereto in a plane which is parallel to the axis of the turret and normal to the axis of the chuck throat when the chuck is in operating position. This plane, when the turret is stopped at a station, also is normal to the axis of the spindle machine at that station.

The chuck is also mounted on its carriage for rotation about an axis which is horizontal and intersects the throat axis, and is disposed in a plane normal to the axis of the spindle at that station. Power means are provided for rocking each chuck, independently of the others, about its transverse axis through 180°, so that one end of the sleeve held thereby is first presented in coaxial relation toward and facing the spindle, and then the other end is so disposed. Means are provided at each station for movement with the associated spindle and engagement with the chuck carriage for shifting the carriage in the plane normal to the spindle axis so as to position the chuck throat center on the axis of the spindle. Additional means are provided to latch the chuck in rotated position about its transverse axis wherein the axis of its throat is coincident with the axis of the spindle. Finally, means are carried by the turret for preloading the chuck, preparatory to machining a sleeve held therein, so as to prevent deflection of the chuck by the tool in a direction axially of the spindle machine, and to prevent rocking of the chuck about its transverse axis to positions in which the axis of its throat is tilted out of coincidence with the axis of the spindle machine.

The machine is made to operate in such a manner that each sleeve can be chucked at a feed and discharge station, carried in the chuck to the next station and there machined at one end. Thereupon, the chuck is rotated 180° and the sleeve is machined at its other end. This dual machining from opposite ends is performed at each station, unless requirements of the work dictate otherwise, the turret being indexed accurately to each station after the completion of the two machining operations at each machining station. Sleeves are being machined in all of the stations concurrently. When the chuck completes its circuit about the turret axis and reaches the feed station, it opens for the first time after having first gripped a sleeve, discharges the sleeve, and receives another.

The machine is quite large so that heavy inertial stresses are involved. For example, for pipe couplings from 2½" up to 5½", outside diameter, using five stations, the turret may weigh as much as four tons and is indexed through 72° for moving the chucks from one station to the next. This indexing movement is to be accomplished in a fraction of a second, including the time required for starting and stopping the rotation of the turret. Correspondingly, each chuck must be positioned accurately and must roll over and be repositioned accurately at each station in a very short time.

In addition to the broader aspects of the machine, these heavy inertial forces require specialized equipment such as he driving and indexing mechanism for the turret, and the operating and preloading mechanism for the chucks, all of which are set forth in certain of my co-pending applications, Serial No. 140,751, filed September 26, 1961, and entitled Indexing Mechanism and Serial No. 137,084, filed September 11, 1961, and entitled Roll-Over Chuck, now U.S. Patent No. 3,083,024, issued March 26, 1963.

Various specific objects and advantages of the present invention will become apparent from the following description wherein reference is made to the drawings, in which:

FIG. 2 is an enlarged vertical sectional view taken on the line 2—2 in FIGS. 1, 10 and 12, the spindle machines being omitted for clearness in illustration;

FIG. 3 is an enlarged fragmentary front elevation of a portion of a turret of the machine with a chuck and its carriage supported thereon, and is viewed from line 3—3 in FIG. 1, part thereof being shown in section for clearness in illustration;

FIG. 4 is a fragmentary vertical sectional view taken on the line 4—4 in FIG. 3, showing the floating support for the chuck carriage;

FIG. 5 is a fragmentary horizontal sectional view taken on the line 5—5 in FIG. 3;

FIG. 6 is a fragmentary horizontal sectional view taken on the line 6—6 in FIG. 3;

FIG. 7 is a fragmentary side elevation of a portion of the turret and a chuck carriage, showing the chuck rollover mechanism and part of the controls therefor;

FIG. 8 is a view similar to FIG. 7, with part of the chuck carriage removed for clearness in illustration of the chuck body and the preload mechanism therefor;

FIG. 9 is a fragmentary side elevation, showing the turret and its indexing mechanism, the turret being viewed as indicated on the line 9—9 in FIGS. 1, 10 and 12;

FIG. 10 is a horizontal sectional view taken on the line 10—10 in FIG. 9;

FIG. 11 is a fragmentary rear elevation of the structure illustrated in FIG. 10, and is taken as viewed on line 11—11 in FIG. 1;

FIG. 12 is a top plan view of the turret illustrated in FIG. 9, part thereof being shown in section for clearness in illustration;

FIG. 13 is a fragmentary end elevation showing part of the stabilizing mechanism and filter, as viewed from the line 13—13 in FIG. 10;

FIG. 14 is a fragmentary side elevation as viewed from line 14—14 in FIG. 10;

FIG. 15 is a fragmentary top plan view showing the supporting arms for the controls carried on the spindle stabilizer of FIG. 1;

Figure 1:
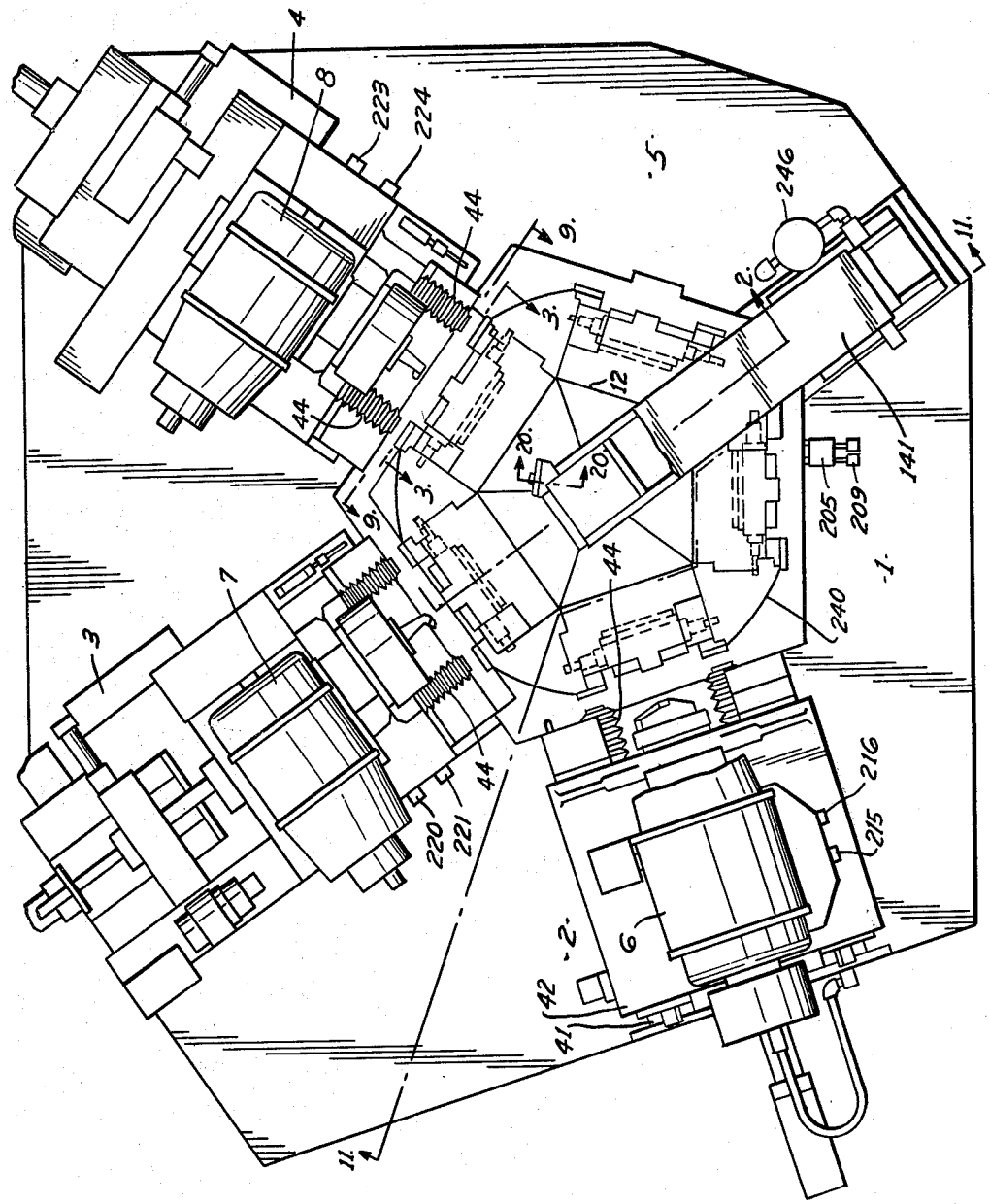
FIG. 1 is a top plan view of an apparatus embodying the principles of the present invention, and including a plurality of pipe machining spindles, the supporting arms for certain controls being omitted for clearness in illustration.
Figure 16:
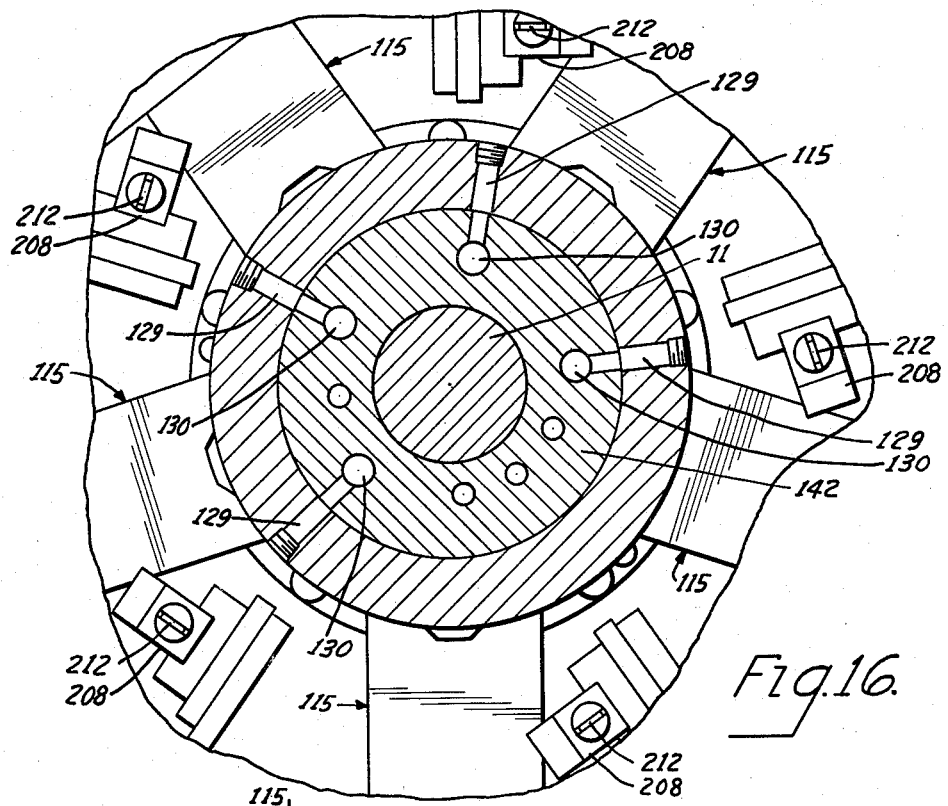
Figure 17:
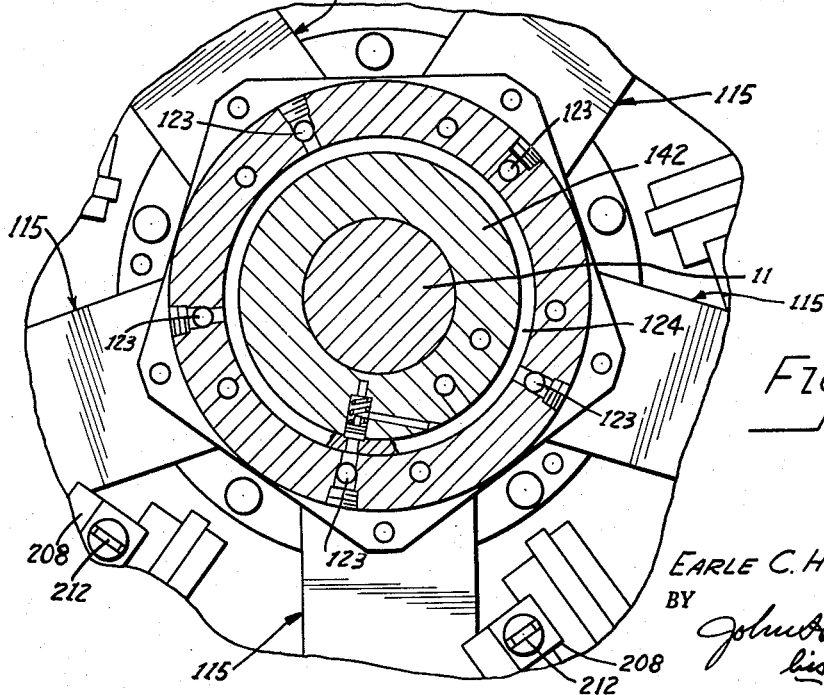

FIGS. 16 and 17 are enlarged fragmentary horizontal sectional views of the pintle and a fragment of the turret, and are taken on the lines 16—16 and 17—17, respectively, in FIG. 2;

FIG. 18 is a fragmentary front elevation of a portion of the chuck carriage and chuck, showing the arrangement of some of the control devices thereon;

FIG. 19 is a vertical sectional view taken on the line 19—19 in FIG. 18;

FIG. 20 is a fragmentary sectional view through the upper portion of the spindle and is taken on the line 20—20 in FIGS. 1 and 12;

FIG. 21 is a fragmentary hydraulic diagram showing the controls and fluid lines to the pintle and from the pintle to a typical one of the stations;

FIG. 22 is a diagram showing the limit switch and the control valve for some of the hydraulic assemblages; and FIG. 23 is a diagram showing the indexing, throttling, and locking circuits of the turret.

Referring first to FIG. 1, the invention, as mentioned, is shown for purposes of illustration as applied to the machining of opposite ends of cylindrical sleeves to form pipe coupling sleeves. A typical operation is one wherein rotary spindle machines are employed at the machining stations. In the illustrative operation, each end of each sleeve is to be faced, bored, tapped, and, optionally, deburred. For this purpose, five stations are provided, these being, in order, a feed station 1, a facing station 2, a boring station 3, a tapping station 4, and a deburring station 5. The finished coupling is discharged at the feed station. The machines are arranged with their spindle axes horizontal and directed toward a common vertical axis, and spaced 72° apart from each other. For the operation described, rotary spindle machines 6, 7, and 8, are placed at the stations 2, 3, and 4. Station 5 is for an additional machine, such as a deburring machine, if desired.

In order to transport the sleeves from one station to another, a rotary turret conveying means is used. The conveying means, as shown in FIGS. 1 through 6, is in the form of a base frame 10 on which is fixedly mounted an upright spindle 11 having its axis coincident with the common axis about which the machines are disposed. A turret 12 is rotatably mounted on the spindle and carries gripping chucks 14 facing outwardly from the turret and normally disposed with their throat axes horizontal and intersecting the spindle axis. Since each chuck 14 and its carriage and operating mechanisms are the same in form and function, only one chuck and its supporting carriage is described herein in detail.

As mentioned, the chuck 14 must operate when at each machining station to hold the sleeve or workpiece for presenting one end of the sleeve for machining, and then, while remaining at the station, to roll over so as to present the other end of the sleeve for machining. At the same time, the chuck must be held accurately in position circumferentially of the turret or spindle axis, at the proper elevation, with its throat axis coincident with the axis of the spindle at the particular station, and under sufficient preload against deflection by the force of the machine tool when the tool is advanced by its spindle.

For these purposes, as illustrated in FIGS. 1 and 3 through 5, each chuck is mounted on a carriage 20 which, in turn, is juxtaposed on an upright face 21 of the turret 12. Each of the faces 21 is normal to a radial plane through the axis of the turret.

In order to support the carriage 20 for limited universal floating movement parallel to and along the face 21 of the turret, the carriage 20 is provided at its upper end with a slide 22 and at its lower end with a slide 23. The slides are held and guided by suitable guides 24 and 25, respectively, which are secured to the turret by bolts or otherwise. The guides 24 and 25 hold the carriage in proper position against the face 21 of the turret with slight operating clearance. Suitable ball bearings, as indicated at 26 in FIGS. 2, 5 and 9, are interposed between the inner face of the carriage 20 and the face 21 of the turret so that the floating movement of the carriage 20 is free from heavy frictional drag.

In order further to reduce inertial and frictional stresses occasioned by the floating movement of the carriage 20, it is resiliently supported on counterbalance supports arranged one at each lateral margin of the carriage.

Such a spring support may comprise springs 27 and adjustable supporting blocks 28 which are adjustably mounted on the turret near the lateral margins of the carriage 20. Each block 28 is guided for vertical and horizontal adjustment relative to the turret in a suitable slideway 29 on the turret and is secured in fixed operating position on the turret by suitable bolts 30. The blocks 28 engage the carriage with lateral clearance and thereby limit its movement longitudinally of the guides 24 and 25.

A lug or bracket 31 is provided on the turret beneath each block 28. Each bracket 31 carries an adjusting screw 32 by which its block 28 can be positioned accurately and buttressed vertically to prevent it from creeping downwardly out of position in event of any loosening of the bolts 30.

A suitable lug 34 is fixedly secured on the carriage 20. A tension rod 35 is slidable vertically in a bore in the lug 34. The rod 35 extends through the counterbalance spring 27 and thus retains it properly in position between the lug 34 and a washer 36 carried on the lower end of the rod 35. An adjusting nut 37 is mounted on the rod 35 at the upper face of the lug 34 for adjusting the preloading of the spring 27 by the rod 35. The washer 36 rests on the top of the block 28 so as to transfer the spring reaction from the block 28 to the lug 34. With this arrangement, the carriage 20 can float a limited amount universally along the face 21 of the turret while counterbalanced and anti-frictionally held against the face 21.

Since the carriage 20 is so arranged for floating movement, means must be provided for accurately positioning it and holding it fixedly in position at each station. For this purpose, as best illustrated in FIGS. 1, 3, 5, and 6, the carriage 20 is provided with integral sockets 38 which open forwardly toward the spindle machines and whose axes are horizontal and parallel to the machine spindle axis. Suitable bearing sleeves 39 are provided in the sockets.

As illustrated in FIGS. 1 and 5, for example, the spindle machine 8 is shown, the spindle of the machine being mounted on a suitable carriage 40 have slides 41 operable on slideways 42, and so arranged as to permit the advance of the spindle axially toward and away from the axis of the turret. Mounted on the carriage 40 are a pair of rigid guide pins 43 which are arranged to enter the sleeves 39 of the sockets 38 and fit them snugly so as to shift and hold the chuck carriage 20 in the accurate aligned position relative to the pins and spindle machine carriages, and therefor relative to the axis of the spindle of the machine 8. Suitable accordian pleated covers 44 are provided on the pins to prevent their contamination by foreign material.

Thus, as each chuck is presented to the machine 8, and the spindle carriage 40 advances, the pins 43 enter the sockets 38 and shift the floating carriage 20 along the plane of the upright face 21 of the turret into the proper machining position. Each spindle machine is provided with like pins 43 operating in like manner.

As mentioned, each chuck 14 is mounted on its carriage for rocking about an axis extending transversely of its throat axis. In the form illustrated, this rocking transverse axis is disposed horizontally in a plane normal to the axis of the associated spindle. Since the chucks and their operating mechanisms are identical, one only will be described in detail.

Referring to FIGS. 3, 4, and 5, the chuck 14 comprises a body 50 which is provided with horizontal coaxial trunnions 51 and 52 at its opposite sides, respectively. The trunnions are rotatably supported in suitable roller bearings 53 and 54, respectively, on the carriage 20. Mounted within the body 50 are gripping jaws 55 which are arranged to be advanced concurrently toward the axis of the chuck throat and receded therefrom concurrently. A piston wedge ring 56 is provided for operating the jaws concurrently. This ring has a large diameter portion 57 and a reduced diameter portion 58, these portions being slidable in corresponding bores 59 and 60, respectively, in the body 50. Suitable O-ring seals 61 are provided on the portions 57 and 58 of the ring so as to form a seal between its end margins and the walls of the bores 59 and 60, so that the ring acts as a hydraulic piston. The ring 56 is provided at its inner periphery with a wedge surface 62 which engages complementary wedge surfaces 63 on the jaw 55. These wedge surfaces are so arranged that advancing of the ring forwardly toward the machine 8, advances the jaws to gripping position. The jaws may be of the general type disclosed in U.S. Patent of Reynold G. Anschutz, No. 2,982,557, issued May 2, 1961 and entitled "Collet Chuck." As there disclosed, each jaw is held at its ends by suitable coil springs 66 against slide surfaces. The springs not only assist in maintaining the jaws in parallelism with their starting positions, but also act as return springs for returning them to retracted position upon withdrawal or retraction of their closing wedge ring 56. The specific type of gripping jaws, however, is not a part of the present invention.

The jaws 55 preferably have gripping face elements 65 which are quickly detachable, as described in my copending application, Serial No. 147,645, filed October 25, 1961, and entitled Chuck with Detachable Gripping Jaws, now U.S. Patent No. 3,083,025, issued March 26, 1963.

In order to supply pressure fluid to the bore 59, at the rear of the large diameter portion 57 of the wedge ring 56, a suitable duct 67 is provided in the trunnion 52, and is connected to a suitable fitting 68 through which pressure fluid under control of a remote valve is supplied.

To rotate the chuck to desired angular positions about the common axis of the trunnions 51 and 52, the structure illustrated in FIGS. 3 and 7 is provided. The trunnion 51 is provided with a driven gear 70 which is keyed thereto for rotation therewith. The gear 70 is driven by a gear segment 71, pivotally mounted by a pivot 72 on the side wall of the carriage 20. For rocking the gear segment 71 about its pivotal axis and thereby, through the segment 71 and gear 70, rocking the chuck body 50 about the axis of the trunnions, suitable power means are provided. The power means comprises a reversible piston and cylinder assemblage 73, including a cylinder 74 and a piston 75 having a piston rod 76. The piston rod is pivotally connected, as indicated at 77, to the gear segment and the cylinder is pivotally connected, as indicated at 78, to a suitable lug on the carriage 20. Thus, upon extension and retraction of the piston rod by fluid pressure in the reversible piston and cylinder assemblage, the chuck 14 is rocked in opposite directions to the desired positions for operation, selectively. Usually, it is rocked from its one operating position 180° to the other operating position and reversely rocked for return. Pressure fluid is supplied to the assemblage 73 through the same valve 90 that controls the roll-over power means of the chuck, as is later described.

To assure that the axis of the chuck throat is horizontal and parallel with the axis of the spindle of the machine 8, the chuck body 50 is provided with suitable sockets 80 having frusto-conical walls with their larger bases disposed outwardly and their axes extending parallel to the axis of the trunnions 51 and 52.

Mounted in the carriage 20 are reciprocating latching pins 81. These pins are accurately mounted in sleeve bearings 82 so as to be coaxial with the sockets 80 when the chuck is precisely in proper rotated position about the axis of the trunnions 51 and 52. The pins 81 are provided with tapered lead ends 83 complementary to the frusto-conical walls of the sockets 80 so that, should the chuck be slightly out of proper position upon movement of the pins, the pins by cooperation of their tapered ends with the frusto-conical walls of the sockets can rotate the chuck slightly to bring it precisely to the proper rotated position about the axis of the trunnions.

For operating the pins to advanced latching position or retracted free position, suitable reversible hydraulic piston and cylinder assemblages 84 are provided. Each assemblage comprises a cylinder 85 and a piston 86 reciprocable therein, and having a piston rod 87. The rod 87 is fixedly connected to its associated pin 81. Pressure fluid is supplied to opposite ends of the cylinder assemblages 84 by suitable hoses 88 and 89, respectively, through a suitable control valve. As will later be explained, pressure fluid is supplied to the control valve from a supply valve, later to be described, and which is shut off while the valve 90 is being preset. The valve 90, therefore, is a presettable means which, while the pressure fluid is shut off, is preset, as will now be described, so that when the pressure is again admitted, it will cause rotation of the chuck by the piston and cylinder assemblage 73 through 180° from its previous operating position.

As best illustrated in FIG. 7, the valve 90 is of a conventional type in which the porting is set by rotation of a stem 91. The stem 91 is driven by a cam wheel 92 having shoulders 92a disposed radially of the stem 91. In order to preset the presettable means or valve 90, a rocker arm 93 is pivotally mounted on the carriage 20 by a pivot 94. The arm carries at its lower end a cam roller 95 which, when the lever 93 is swung clockwise about its axis, or towards the turret, in FIG. 7, engages one of the shoulders of the star wheel 92 and rotates the wheel 90°. When, on the other hand, the lever 93 returns, it is inoperative with respect to the next successive shoulder on the star wheel.

For this purpose, it comprises an upper portion 93a and a lower portion 93b, these portions being connected together by a pivot 96. A stop pin 97 is provided on the upper portion 93a to arrest rotation of portion 93b in a counterclockwise direction about the pivot 96, but to permit it to rock in a clockwise direction thereabout. A plate 98 is connected by the pivot 94 so as to bear against the portion 93A. A spring pressed pin 99 is mounted in a socket 100 carried by the carriage 20 and is suitably urged by a spring 101 against the plate 98. The pin 99, therefore, yieldably returns the arm 93 counterclockwise about the pivot 94. As the arm returns, the portion 93b swings free of the pin 97 and passes the aligned shoulder of the cam wheel 92 without rotating the wheel.

In order to operate the arm 93, the carriage 20 is provided with guide plates 102 having openings 103 and 104 therein, the openings facing away from the turret and opening toward the spindle machine. Mounted on the carriages of the spindle machines are suitable trip fingers, such as indicated at 105 and 106, respectively. The finger 105 is carried by the tapper and borer machine. The finger 106 is carried by the facer. These trip fingers are arranged so that upon advancement of the spindles toward and into machining operation, trips pass through the passages 103 or 104, respectively, as the case may be, and strike the arm and swing the arm 93 clockwise about the pivot 94, thus rotating the cam wheel 92 one shoulder. Upon retraction of the spindle carriages 40, the fingers 105 and 106, whichever is operating, is released from the lever 93, whereupon, due to the spring return pin 99, the lever 93 is swung counterclockwise, its portions 93a and 93b buckling about the pivot 96 so as to pass the cam wheel shoulder which has been moved to the upright position on the advance stroke. In this way, the star wheel sets the presettable valve means during each machining operation to a position such that, when pressure is admitted to the presettable valve means, it will deliver pressure fluid to the piston and cylinder assemblage 73 so as to rock the chuck body 50 through an angle of 180° from the position in which it was at the beginning of the operation.

As mentioned, it is desirable that the chuck body 50 be prevented from deflection transversely of the common axis of the trunnions 51 and 52 during the machining operation. For this purpose, and to prevent any rocking of the body about the common axis, preloading means are provided. The preloading means, indicated generally at 110, in FIGS. 2, 5, and 8, comprises a preloading member 111 which, in the form illustrated, is a sleeve slidably mounted in a bearing 112 in the chuck carriage 20 so as to move in coaxial relation with the chuck throat when the chuck is precisely in its operating position with respect to a machine spindle.

The sleeve 111 is so arranged that its end engages the chuck body 50 outwardly from the axis of the chuck throat and in surrounding relation to the axis, so that the force applied by the sleeve is evenly distributed and operates to resist tilting of the body about the axis of the trunnions 51 and 52 and deflection toward the turret. The forward end face of the sleeve, therefore, defines a plane normal to the axis of the spindle of the machine when the chuck is in operating position at a station. The end faces of the chuck 14 are flat and parallel to each other and define planes normal to the axis of the chuck throat. Thus when the sleeve is pressed firmly against the chuck, any slight discrepancy in the rocked position of the axis of the throat about the axis of the trunnions 51 and 52 is eliminated and the axis of the throat is brought to a true horizontal position coincident with the axis of the spindle.

Since the carriage 20 is floatingly mounted on the turret, clearance is provided between the sleeve 111 and the turret. For this purpose, the turret has a passage 113 of slightly larger diameter than the sleeve, depending upon the distance or amount of floating movement permitted for the carriage 20. Thus the sleeve at all times moves in precise position relative to the chuck carriage. It is necessary, however, that the sleeve be applied with considerable pressure to preload the chuck carriage properly. For forcing the sleeve 111 firmly against the face of the chuck exposed thereto, a suitable reversible piston and cylinder assemblage 115 is mounted in the turret. This assemblage includes a piston 116 operating in a cylinder 117 and having a piston rod 118. The rod 118 has a reduced end portion 119. The sleeve 111 is provided with a transverse web 120 which is provided with an axial passage 121 which receives the reduced portion of the piston rod 119. The passage 121 is slightly greater in diameter than the reduced portion 119 of the piston rod and the rod is connected to the web so as to float a slight amount relative to the sleeve. This prevents any binding between the web and the rod due to slight misalignment of the two due to the shifting of the carriage 20 transversely of the piston axis.

As illustrated in FIGS. 5 and 20, suitable ducts 122 and 123 in the turret are connected to opposite ends of the cylinder 117 for supplying pressure fluid for driving the piston to extended position to apply the sleeve 111 to the chuck and to retracted position, respectively. The ducts 122 and 123 are so arranged that one is vented to a sump when pressure is supplied to the other. These ducts are connected to suitable channels or ducts 124 and 125, respectively, in the turret. The channels, in turn, are connected to suitable ducts in the pintle stabilizing sleeve which, in turn, are controlled by valves, as will later be described.

In order to supply coolant to the tools of the spindle machines, the sleeve 111 is provided with a coolant duct 127 connected by a hose 128 to a port 129 in the turret which, at the stations, is aligned with coolant ducts 130, respectively, in the stabilizing sleeve later to be described, as best illustrated in FIGS. 2, 16 and 17.

The reduced portion of the piston rod, as illustrated in FIG. 5, is provided with a transverse duct 133 and a longitudinal duct 134 which leads to a nozzle 135 on the end of the piston rod. The nozzle 135 has spray ports 136 arranged to spray the coolant outwardly and forwardly, thus to spray it onto the portion of the sleeve being machined. Suitable fins 138 may be provided along the piston rod 118 for directing the coolant discharged from the nozzle and assure alignment of the coupling sleeve or workpiece properly in the jaws.

The specific structure of the chucks is described and claimed in my copending application, Serial No. 137,084, filed September 11, 1961, and entitled "Roll-Over Chuck, now U.S. Patent No. 3,083,024, issued March 26, 1963.

As mentioned, the weight of the turret and mechanism supported thereby is several tons, yet it must be started, rotated, and stopped quickly in precise position. This subjects the pintle to severe stresses. Accordingly, the frame 10 has connected thereto an upright pintle stabilizing portion 140 which, at its upper end, is provided with a transverse stabilizer arm 141. The outer end of the arm carries a stabilizing sleeve 142 which accommodates the reduced diameter upper end portion of the pintle 11. The element 141 and sleeve 142 not only act to stabilize the pintle 11, but also house various ducts, hoses, and conduits which lead to the turret for supplying coolant and operating pressure fluid to the various hydraulic assemblages on the turret, as is later explained.

For rotating and indexing the turret, a precise indexing mechanism, as disclosed in my copending application, Serial No. 140,751, filed September 26, 1961, and entitled "Indexing Mechanism" is employed. This mechanism comprises an indexing plate 150 connected to the base of the turret for rotation therewith about the spindle axis. The indexing plate 150 is provided with a plurality of circumferentially spaced, radially open indexing notches 151, corresponding in number and position to the machining stations.

Mounted on the base of the spindle 11 is an oscillating plate 152 which is oscillatable about the axis of the spindle on suitable bearings 153. Pivotally mounted on the plate 152 for oscillation about an upright axis is a driving member 154, the member being connected to the plate 152 by a pivot 155. The driving member 154, in turn, is pivotally connected to yoke 156 which is driven by a reversible piston and cylinder assemblage 157. A stop plate 158 is provided on the plate 152 for limiting the swinging of the member 154 about its pivot 155 in a counterclockwise direction relative to the plate 152.

The assemblage 157 includes a cylinder 159 in which is reciprocable a piston 160 having a piston rod 161 which is pivotally connected to the member 154 by the yoke 156. The cylinder is mounted in a bracket 168 on the frame of the machine for rocking about an upright axis 169. The driving member 154 has an indexing detent 170 which is adapted to engage notches 151 in the plate 150 for swinging the turret when the assemblage 157 is retracted from an extended position.

In order to permit the detent 170 to cooperate with the notches 151 for driving the turret upon retraction of the piston and cylinder assemblage 157, the driving member 154 carries a cam roller 171. The cam roller 171 operates against a cam surface 172 on a precise indexing and latching rocker arm 173 when the rocker is out of indexing position, as illustrated in solid lines in FIG. 10. The assemblage 157 is moved to extended condition while the rocker 173 is in the latching position illustrated in dotted lines in FIG. 10. As the assemblage 157 extends, it swings the driving member 154 about the pivot 155 on the plate 152 until the member strikes the stop 158. Thereupon, both the member 154 and the plate 152 swing about the axis of the turret in a counterclockwise direction to the starting position, indicated in dotted lines in FIG. 10.

During this movement, the cam roller 171 is disengaged from the cam surface 172 because the indexing arm 173 is in latching position and the cam surface 172 retracted.

The precision indexing arm 173 is pivotally mounted on the pivot 174 on a bracket 175 which is fastened to the base of the frame. The arm 173 rocks about the upright axis of the pivot 174. The arm 173 is connected by a suitable yoke and a pivot 176 to a reversible piston and cylinder assemblage 177. This assemblage comprises a cylinder 178 and a piston 179 having a rod 180 which is connected by the yoke and pivot 176 to one end of the arm 173. The opposite end of the arm 173 has a detent 182 which, when the assemblage 177 is retracted, enters the notch 151 adjacent to it. The notches 151 have side walls which diverge outwardly from the turret axis. The side walls of the detent 182 are complementary thereto. As a result, as the detent 182 is forced into a notch 151 by the assemblage 177, it can swing the turret slightly and draw the turret precisely into index position and hold it there.

As mentioned, while the detent 182 is seated in a notch 151, the member 154 is moved to starting position and the cam surface 172 is out of contact with the cam roller 171.

To index the table, the assemblage 177 is extended and rocks the arm 173 to unseat the detent 182. While the detent 182 is thus unseated, the driving member 154 is pulled on the driving stroke by contracting the assemblage 157. Since the arm 173 is held in released position by the extension of the piston and cylinder assemblage 177, the cam surface 172 is held precisely in proper position for cooperation with the cam roller 171. Retraction of the assemblage 157 swings the driving member 154 clockwise about the pivot 155, causing the detent 170 to enter the notch 151 adjacent to it. The coaction of the cam surface 172 and cam roller 171 maintains the detent 170 seated in the notch so that the member 154 with the plate 152 swings about the turret axis and in a clockwise direction rotates the turret clockwise about the axis of the spindle 11.

When the detent 170 has rotated the turret through 72°, assuming five stations are provided, the piston and cylinder assemblage 177 is reversed, thus removing the cam track 172 from the roller 171 and releasing the driving member 154 for subsequent swinging about the axis of the pivot 155 to disengage the detent 170 from its associated notch 151 on the next extension stroke of the assemblage 157. At the same time, the detent 182 is pressed firmly into the notch 151 aligned with it, thus arresting and precisely positioning the turret in proper rotated position about the axis of the spindle.

In order to assure the prompt starting, rapid advance, and prompt, but cushioned, stopping of the turret, a suitable peripheral cam 185 is mounted on the plate 152 and is adjustable circumferentially thereon. The cam 185 operates a cam follower 186 of a throttling valve 187. As indicated in FIG. 23, this valve has a throttling orifice and bypass 189 arranged to permit free flow of pressure fluid to the head end of the cylinder 159 and progressively throttle the return flow from the head end to the sump upon retraction of the assemblage 157 by admission of pressure fluid to the rod end. The throttling valve 187 has ports 190 and 191, the port 190 being connected to a reversing valve and the port 191 being connected to the head end of the assemblage 157.

The throttling orifice is fully closed when the assemblage 157 reaches its fully retracted position. The retraction from open throttle to fully closed throttle is gradual throughout the driving of the turret in the indexing direction.

Another pipe line leads of the rod end of the assemblage 157 from the same reversing valve, as is later described.

Thus at each operation, the assemblage 157 starts the turret rapidly, swings it through substantially 72°, accelerating it through the first 24°, gradually slows it down along the remainder of its path, and thus brings it to a gradual cushioned stop substantially in the rotated position desired. When it reaches this position, the assemblage 177 is operated to cause the rocker 173 to position the turret precisely and hold it in precisely indexed position.

A control mechanism is provided for synchronizing operations at the various parts described and for cycling the machine.

Referring to FIGS. 15 and 2, the stabilizing arm 141 carries conventional pipes which lead to ducts in the sleeve 142, respectively, and to a source of power such as a conventional motor driven hydraulic pump, and to a sump. The ducts in the sleeve lead to ports and sealed circumferential channels in the turret, thereby providing feed and return conduits for the hydraulic mechanisms. The channels are isolated from each other by suitable O-ring seals, as indicated in FIGS. 2 and 20.

Referring first to opening and closing of the chuck, a pneumatically operated settable cam device 201 is mounted on the stabilizer arm 141 in fixed position circumferentially of the turret axis. The device includes a reversible pneumatic piston and cylinder assemblage comprising a cylinder 202, a piston having a rod 203 on which is carried a hardened operating cam 204. The opposite ends of the cylinder 202 are connected to a reversing valve 205 which is adapted to connect, concurrently, one end of the cylinder to a source of compressed air, such as a tank 206, and the other end to the atmosphere, selectively. The valve 205 is operated by a rockable foot treadle 207 located at the feed station. Chuck closure control valves 208 are provided on the turret for the chucks 14, respectively. For closing each chuck 14, air is admitted to the head end of the cylinder 202 to depress the head 204 while an associated valve 208 on the turret is aligned vertically with the head. The valve 208 is normally open, being so held by a spring, and is connected by hoses 209 and 210 to separate channels 209A and 210A, respectively, in the sleeve 142. One of the channels supplies hydraulic pressure and the other is connected to a sump.

When open, the valve 208 connects the pressure hoses 209 to a hose 211 which leads to the fitting 68 of the chuck and thus applies fluid pressure to the ring 58 to advance it for closing the jaws 65. The valve has an operating stem 212 which is engageable by the head 204 when aligned therewith. The stem 212 is depressed by the depression of the head 204 to close the valve 208. Upon its closure, the valve 208 vents the bores 59 and 60 to the sump, whereupon the springs 66 return the jaws and ring 56 to starting position.

Referring next to the preload and latching mechanisms, assuming the jaws are closed, the limit switch 215 is arranged to be operated by the spindle carriage 40 of the facer 6 as the facer starts forward from its retracted position. The limit switch controls a solenoid operated valve 216 in a manner such that, as the facer spindle starts its advance, the valve 216 operates to admit pressure to the head end of the preloading assemblage 115 to advance the sleeve 111 and preload the chuck and concurrently vent the rod end of the assemblage 115. Concurrently, it admits pressure fluid to the head end of the latch pin assemblages 84 through the hose 88 and vents the rod ends through the hose 89. This seats the latch pins firmly. Since the head ends of the assemblages 84 and 115 are connected in parallel, they build up pressure concurrently.

This same setting of the valve 216 discontinues the supply of pressure to the presettable valve 90.

Upon advance of the facer carriage 40 to fully advanced position, the finger 106 presets the valve 90 so that, upon pressure subsequently being supplied to it, it will admit pressure to the proper end of the assemblage 73 for rolling the chuck through 180°. As the carriage 40 returns to its retracted position, the limit switch 215 returns to its original position as also does the valve 216. This admits pressure fluid to the rod end of the latch assemblages 84 through the hoses 89 and to the rod end of the preload assemblage 115, and vents the head ends of the assemblages to retract the preload sleeve 111 and the pins 81. The rod end of the latch assemblages 84 and the preload assemblages 115 are connected in series with the valve 90. Consequently, as pressure fluid is admitted to the rod ends of these assemblages, it also is admitted to the valve 90 which has been preset by the finger 106 to deliver pressure fluid to the proper end of the roll-over assemblage 73 and to vent the opposite end. Thus the preload assemblage is retracted to withdraw the preload sleeve. The assemblages 84 are operated to retract the latching pins 81 and the assemblage 73 is operated to rotate the chuck through an angle of 180° from the position in which it was at the beginning of the operation, so as to present the other end of the workpiece for machining.

Upon the next advance of the facer, the sequence is repeated.

Arranged on the boring machine 7 is a limit switch 220 which controls a solenoid operated valve 221. The valve 221 is connected by suitable pipes to opposite ends of the precise positioning or shroud cylinder 178. During the advance of the boring machine, the valve delivers pressure to the rod end of the assemblage 177 and vents the head end so that the assemblage holds the detent 182 seated in the associated one of the notches 151. Upon retraction of the boring machine 7, the limit switch 220 controls the valve 221 so that it supplies pressure fluid to the head end of the cylinder 178 and vents the rod end, thereby withdrawing the detent 182 from its associated notch.

On the frame of the tapper machine 8 is a limit switch 223 which controls a solenoid operated valve 224. The valve 224 is connected by suitable lines to the port 190 of the valve 187 and by another line to the rod end of the indexing assemblage 157. It thereby controls the flow of pressure fluid to opposite ends of the indexing driving assemblage 157.

As noted hereinbefore, the throttling valve 187 permits a free flow of pressure fluid to the head end of the cylinder 159 and a gradually throttled return flow therefrom. It is fully closed to block the return flow when the cylinder reaches its fully retracted position.

The valve 224 also permits full flow and return from the rod end of the cylinder 159. The limit switch 223 is one which requires two operations to cause one operation of the valve 224. Therefore, the indexing occurs only after every other advance and retraction of the tapper machine. Thus it operates only after every other complete cycle of the tapping machine 8 so that both ends of the workpiece or sleeve can be machined by the machines before indexing thereby.

The limit switch is operable when closed to energize the solenoid valve 224 to admit pressure to the rod end of the assemblage 157 to index, and when open, to permit return of the valve 224 to admit pressure fluid to the head end of the assemblage 157.

It is to be noted that the limit switches do not have to be on any particular one of the machines. All or any part of their number may be placed on any one or more of the machines. Thus they may be associated with the machines according to convenience in installation.

It is desirable that the turret remain stationary at all times when the chucks 14 are in a rocked position which disposes them more than a very few degrees out of their normal operating positions. Accordingly, limit switches are provided which are operated in response to the rocked positions of the associated chuck 14. These switches deenergize the circuit to the limit switch 223 to prevent rotation of the turret whenever any one of the chucks is out of its proper position appreciably, which proper position is one wherein the throat axis is substantially horizontal.

To this end, the arms 226, as shown in FIG. 15, are arranged on the stabilizer arm 141, one at each station. Since the arms and control devices thereon are identical, only one is described in detail. Each arm carries a pair of limit switches 227 and 228 of the type which operates in response to changes in the magnetic flux flowing across the air gap. The switches 227 and 228 are arranged with their gaps opening downwardly and extending, lengthwise, tangent to the operating path of operating blades 229 and 230, respectively, which are carried on the chuck carriages, respectively, as illustrated in FIGS. 18 and 19.

The gaps are open at the ends and the blades, when raised, are carried through the gaps upon rotation of the turret. The blades 229 and 230 are mounted in slideways 231 and 232 for vertical movement and are held in lowered positions by springs, such as the spring 233, as shown for the blade 230. Cam rollers 235 and 236 are mounted on the lower ends of the blades 229 and 230, respectively, and cooperate with cams 237 and 238 on the chuck body 50. Thus, with one face of the cam upright and exposed away from the turret, one of the blades is raised and the other lowered. With the other face upright and facing away from the turret, the positions of the blades are reversed. Hence, so long as the throat axis of the chuck is substantially horizontal with all of the chucks at their stations, one blade of each chuck will be in the slot of its associated switch 227 or 228. These switches are normally open. If one blade is in its associated slot, the associated switch closes. The switches of each chuck are connected in parallel and the parallel connected switches of each chuck are in series with those with the like connections of the other chucks. Thus one switch on every chuck must be closed to establish a safety circuit from the source of control voltage to the limit switch 223. Otherwise, indexing cannot be effected. If a chuck rocks out of position between stations, the circuit to limit switch 223 is deenergized and the indexing drive ceases rotation of the turret.

The spindle machines are self-included units having their own driving motors and operational controls. They may be of the general type such as disclosed in U.S. application of William L. Benninghoff, Serial No. 756,556, filed August 27, 1958 and entitled Automatic Taper Thread Forming and Chamfer Cutting Machine now U.S. Patent No. 2,996,736, issued August 22, 1961.

A chip trough 240 is provided and surrounds the turret at a location beneath the chucks, and has an outlet which discharges into a bin through a chute 242. Scrapers 243 may be provided on one or more of the chuck carriages both to scrape the chips to the outlet over the bin 242, whereupon they fall by gravity into the bin.

Coolant from the bin drains into a suitable sump wherein it is pumped in a conventional manner by a pump 244 driven by a motor 245 through a filter 246 and thence by a line 247 to coolant ducts 130 in the sleeve 142, as shown in FIG. 12. These ducts have ports which, when the chucks are at machining stations, align with the fittings 129, respectively, and thereby supply coolant by way of the hoses 128, the passages 127 in the preloading sleeves 111, and the nozzles 135 to the workpiece.

As illustrated in FIG. 13, pressure fluid is applied by a pump 250, driven by a motor 251, to a manifold 252 which, by suitable pipe lines, connects the pressure side of the pump to the manifold. The manifold, in turn, is connected to the various solenoid operated valves.

For convenience in illustration, the solenoid valves operated by limit switches on the spindle machines, are shown adjacent the limit switches. However, they preferably are arranged adjacent the manifold 252. The relation of these switches and valves is illustrated in FIGS. 21 through 23.

As there shown, the valve 216 is a reversible valve and normally connects line a with pressure and line b with a sump. Thus, as illustrated in FIG. 21, wherein the lines a and b are shown, it normally supplies pressure fluid through ducts in the spindle sleeve and turret, to the head ends of the assemblages 84 and 115 through the lines 122 and 88, respectively. When reversed, it supplies pressure fluid to the line b and therefore to the rod end of the assemblage 115 through the duct 123, and to the rod ends of the assemblages 84 through lines 89. A line x leads from the lines 89 to the valve 90 which is preset, as described, to roll over the chuck in the desired direction when pressure fluid is supplied to it.

The solenoid reversing valve 221 normally supplies pressure fluid to a line c and exhausts a line d. Thus, as illustrated in FIG. 23, it supplies pressure fluid to the rod end of the assemblages 177 so as to hold the detent 182 seated to latch the turret. Upon reversal, by the limit switch 220, it supplies pressure to the head end and vents the rod end, thus releasing the detent 182.

The solenoid reversing valve 224, as illustrated in FIG. 23, normally supplies pressure fluid to a line e and connects a line f to the exhaust. Consequently, it normally supplies pressure to the head end of the index assemblage 157. Upon reversal by its limit switch, due to the second retraction of the tapper 8, it supplies pressure fluid to the rod end of the assemblage 157 to index the turret one station.

A conventional power switch is provided for supplying operating voltage to the spindle machines and to the motors of the coolant and pressure fluid pumps. A conventional starting switch which, when closed, starts the operating cycle, is provided. Once started, the cycling is automatic. The usual electric interlocks may be provided to stop all operations if one of the spindle machines fails to operate properly.

*Operation*

Thus, in operation, assuming the machine has stopped with the chuck at the feeding station empty, the power switch is thrown to start the motor to supply coolant and pressure fluid. Next, the control circuit is energized by closing the starting switch. The foot treadle 207 is operated to cause the pneumatic cam device 201 to depress the head 204 and thereby close the valve 208 of the chuck at the feed station. Thereupon, the springs 66 open the chuck jaws 65 releasing the workpiece therein. Next, a new workpiece or sleeve is placed in the chuck 14 at the feed station 1 and the treadle 207 is operated to lift the head 204 and permit the valve 208 to close and thereby direct fluid pressure to the rear end of the piston and wedge ring 56 for closing the jaws 65.

The spindle machines start to advance, the tapper 6 operates the limit switch 215 to cause the solenoid valve 216 to admit pressure fluid to the head ends of the latch assemblages 84 and the preload assemblages 115, thus latching and preloading all chucks 14. As the spindles advance, the borer machine actuates limit switch 220 to operate valve 221 to supply pressure fluid to the rod end of the assemblage 177 to set and hold the precise positioning detent 182 in its aligned slot. All spindles advance and perform their operations on the chucked sleeves, and then retract. When they are retracted, the limit switch 215 causes the valve 216 to admit pressure fluid to the rod ends of the latch assemblage 84 and preload assemblages 115, thus releasing the chucks for rollover and delivering pressure to the preset valve 90 so that it delivers pressure to the proper end of the rollover assemblage 73 for rolling over the chucks, whereupon the machines again advance.

At every other retraction of the tapper 8, if the chucks are in proper rocked positions so that the switches 227 and 228 are closed, the limit switch 223 operates the valve 224 to supply pressure fluid to the rod end of the indexing assemblage 157. This indexes the turret at the same time venting the head end of the indexing assemblage 157 through the adjustable throttle valve 187 to gradually bring the turret to rest in the newly indexed position. Upon advance of the tapper 8, fluid pressure is applied to the head end of the assemblage 157, thus setting it for the next indexing operation. Thus the sequence is continued unless the power is cut off manually, or the power to the limit switch 223 is discontinued due to an improper position.

It is apparent that with the structure described, very rapid production of parts precisely machined from each end, can be obtained.

The machine has been described herein, in the specification and claims, in an upright position, that is, with the turret axis upright. This has been done merely for convenience in description and in indicating relative positions of the parts, not to fix absolute positions of the parts relative to the horizontal or vertical. Where desired, the machine may be positioned with the turret axis horizontal or sloping relative to vertical, depending on use, and the claims are to include any and all such positions, and are not limited to one in which the turret axis is upright.

Having thus described my invention, I claim:

1. In a machine for machining a workpiece, a turret, means supporting the turret for rotation about an upright axis, a plurality of chucks, supporting means, respective to the chucks, and carried by the turret and supporting the chucks on the turret for rotation with the turret and for limited universal floating movement relative to the turret in vertical plane, indexing power means operable to rotate the turret to index the chucks successively to different pre-selected machining stations spaced about the upright axis, power driven positioning means at the stations, respectively, engageable with the supporting means of the chucks when the chucks are at the stations, and operative when so engaged to move the supporting means in said plane relative to the turret and to hold the supporting means in positions, respectively, in which each chuck holds its workpiece precisely in the machining position at its associated station, pivot means, respective to the chucks, mounting each chuck on its supporting means for rotation about a transverse axis which is at a right angle to the axis of the chuck, wherefore each chuck can be rotated about its transverse axis to expose outwardly from the turret, selectively, different parts of a workpiece which it holds, an additional power means, respective to the chucks, each operable to rotate its associated chuck into selected rotated positions about said transverse axis, and power driven latch means to latch each chuck precisely in the selected rotated position, and to release each chuck, selectively.

2. The structure according to claim 1, and further including preloading mechanisms for the chucks, respectively, operable to apply force directly to each chuck for holding the chuck in predetermined rotative position about its transverse axis, for resisting deflection of its pivot means of each chuck transversely of the pivotal axis, and for resisting rocking of the chuck about its transverse axis.

3. The structure according to claim 1 wherein said additional power means of each chuck are operable to rotate the associated chuck 180° about its transverse axis so to move the workpiece held therein to expose directly opposite ends thereof for machining.

4. In a machine for machining a workpiece, a turret, means supporting the turret for rotation about an upright axis, a plurality of chucks, supporting means, respective to the chucks, and carried by the turret and supporting the chucks on the turret for rotation with the turret and for limited universal floating movement in a vertical plane relative to the turret, indexing power means operable to rotate the turret to dispose the chucks successively to different preselected machining stations spaced about the upright axis, machines at the stations, respectively, guide means at the respective stations, each guide means supporting the machine at its station for movement toward the chuck at its station to an extended operating position and away from each chuck to retracted positions, respectively, while the chuck is associated with the station, additional power means, respective to the chucks, for rotating the chucks, respectively, presettable control means for each additional power means and operable to direct the power it receives to its associated additional power means, supply control means for connecting and disconnecting the presettable control means to a source of power, operating means movable in fixed relation to the machines, respectively, and each engageable with the associated presettable control means so as to preset the presettable control means, while the presettable control means is disconnected from the source of power by the supply control means, so as to enable the presettable control means to cause the additional power means to rotate the chuck to a new position when the power is next introduced to the presettable control means, and means operable in relation to the movement of the machines for causing the supply control means to supply power to the presettable control means for causing rotation of the chuck after the machine has moved to a predetermined retracted position clear of the chuck.

5. In a machine for machining a workpiece, a turret, means supporting the turret for rotation about an upright axis, chucks carried by the turret, means supporting each chuck on the turret for universal floating movement in a vertical plane and for rotation about a horizontal axis at a right angle to the axis of the chuck, machine stations spaced about the turret axis, power indexing means to rotate the turret to dispose each chuck at the stations, successively, positioning means at the stations, respectively, for moving the supporting means for the chuck at that station in said plane to precise operating position and for holding the supporting means in the operating position to which moved, additional power means operable to rotate each chuck from one of two rotated positions to the other of the two rotated positions at each station, control means for the additional power means, means at each station operable to operate each of said control means when a particular one of said control means is at said station, and means to hold each chuck precisely in each of said rotated positions at each station.

References Cited in the file of this patent

UNITED STATES PATENTS

| | | |
|---|---|---|
| 1,085,697 | Neckermal et al. | Feb. 3, 1914 |
| 1,574,631 | Mirfield | Feb. 23, 1926 |
| 2,660,738 | Hieber | Dec. 1, 1953 |
| 2,953,069 | Smith | Sept. 20, 1960 |
| 2,974,548 | Miller | Mar. 14, 1961 |

FOREIGN PATENTS

| | | |
|---|---|---|
| 664,007 | France | Apr. 16, 1929 |
| 705,601 | France | Mar. 16, 1931 |